(12) United States Patent
Kimura et al.

(10) Patent No.: US 10,787,780 B2
(45) Date of Patent: Sep. 29, 2020

(54) FLOOD PREVENTION DEVICE

(71) Applicant: HITACHI ZOSEN CORPORATION, Osaka-shi, Osaka (JP)

(72) Inventors: Yuichiro Kimura, Osaka (JP); Yoshito Yamakawa, Osaka (JP); Kunie Miyamoto, Osaka (JP); Toshiaki Morii, Osaka (JP); Kyoichi Nakayasu, Osaka (JP)

(73) Assignee: HITACHI ZOSEN CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 16/477,077

(22) PCT Filed: Dec. 18, 2017

(86) PCT No.: PCT/JP2017/045296
§ 371 (c)(1),
(2) Date: Aug. 14, 2019

(87) PCT Pub. No.: WO2018/131391
PCT Pub. Date: Jul. 19, 2018

(65) Prior Publication Data
US 2019/0390425 A1    Dec. 26, 2019

(30) Foreign Application Priority Data

Jan. 11, 2017    (JP) ................... 2017-002225

(51) Int. Cl.
*E02B 3/10* (2006.01)
*E04H 9/14* (2006.01)

(52) U.S. Cl.
CPC .............. *E02B 3/108* (2013.01); *E04H 9/145* (2013.01)

(58) Field of Classification Search
CPC .......... E02B 3/106; E02B 3/108; E04H 9/145
See application file for complete search history.

(56) References Cited

U.S. PATENT DOCUMENTS

| 4,375,929 A * | 3/1983 | Clark ...................... E04H 9/145 |
| | | 405/114 |
| 5,460,462 A * | 10/1995 | Regan .................... E02B 3/104 |
| | | 405/96 |
| 5,993,113 A | 11/1999 | Darling |

(Continued)

FOREIGN PATENT DOCUMENTS

| FR | 2964999 A1 | 3/2012 |
| JP | 11-256553 A | 9/1999 |

(Continued)

OTHER PUBLICATIONS

Extended European Search Report dated Nov. 29, 2019 issued in corresponding EP Application No. 17891298.6.

(Continued)

*Primary Examiner* — Benjamin F Fiorello
(74) *Attorney, Agent, or Firm* — Pillsbury Winthrop Shaw Pittman, LLP

(57) ABSTRACT

A flood prevention device includes a gate device constituting a passage between a flood prevention area and an outside area, and a portable flood prevention material that separates the flood prevention area and the outside area with the gate device. The gate device has a side wall corresponding to one end of the portable flood prevention material.

4 Claims, 21 Drawing Sheets

(56) References Cited

U.S. PATENT DOCUMENTS

| | | | | |
|---|---|---|---|---|
| 6,216,399 | B1* | 4/2001 | Belarbi | E02B 3/104 52/169.14 |
| 6,679,654 | B1* | 1/2004 | Wittenberg | E02B 3/108 256/13 |
| 6,732,479 | B2* | 5/2004 | Nomura | E02B 3/102 256/13 |
| 8,721,221 | B2* | 5/2014 | Cavenagh | E02B 3/108 405/111 |
| 9,181,669 | B2* | 11/2015 | Stroup | B64F 5/30 |
| 2009/0148237 | A1 | 6/2009 | Linares | |
| 2015/0147120 | A1 | 5/2015 | Adler et al. | |
| 2016/0230362 | A1 | 8/2016 | Frosdick et al. | |
| 2019/0024337 | A1* | 1/2019 | Philipsen | E02B 3/108 |

FOREIGN PATENT DOCUMENTS

| | | |
|---|---|---|
| JP | 2008-285841 A | 11/2008 |
| JP | 5580785 B | 1/2013 |
| JP | 2014-163081 A | 9/2014 |
| JP | 2015-048676 A | 3/2015 |
| JP | 2015-055060 A | 3/2015 |
| JP | 6018460 B | 11/2016 |

OTHER PUBLICATIONS

International Search Report PCT/JP2017/045296 dated Jan. 23, 2018 with English translation.

* cited by examiner

F I G. 1
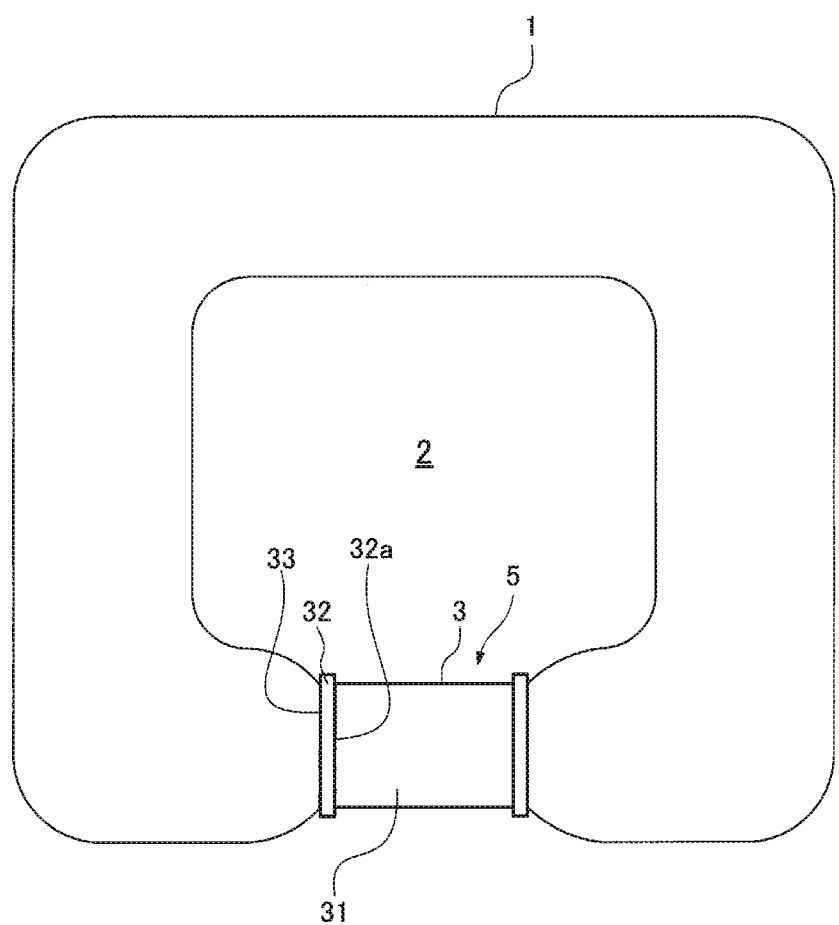

F I G. 1 3
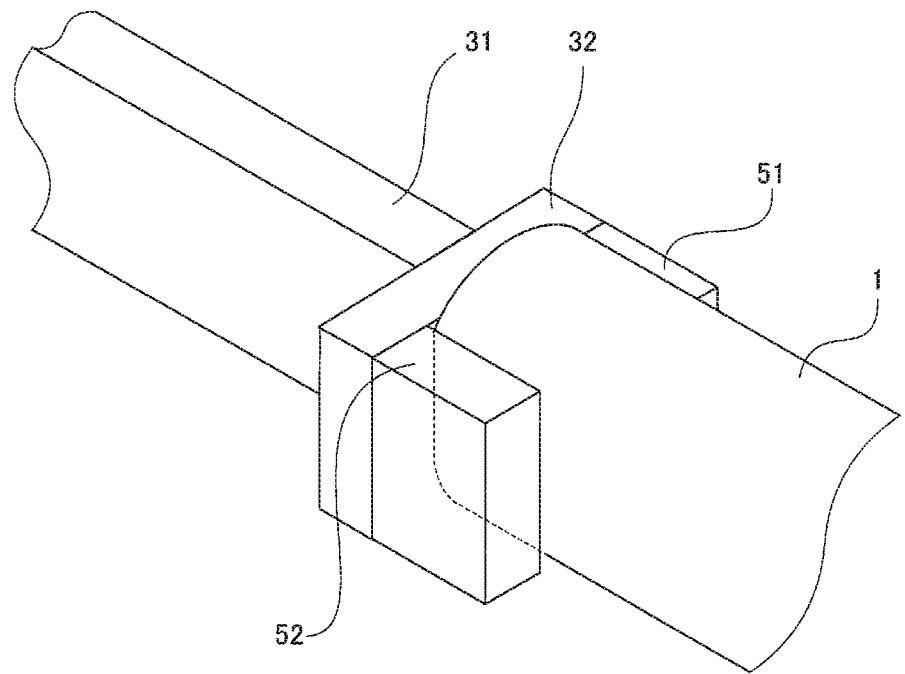
F I G. 1 4
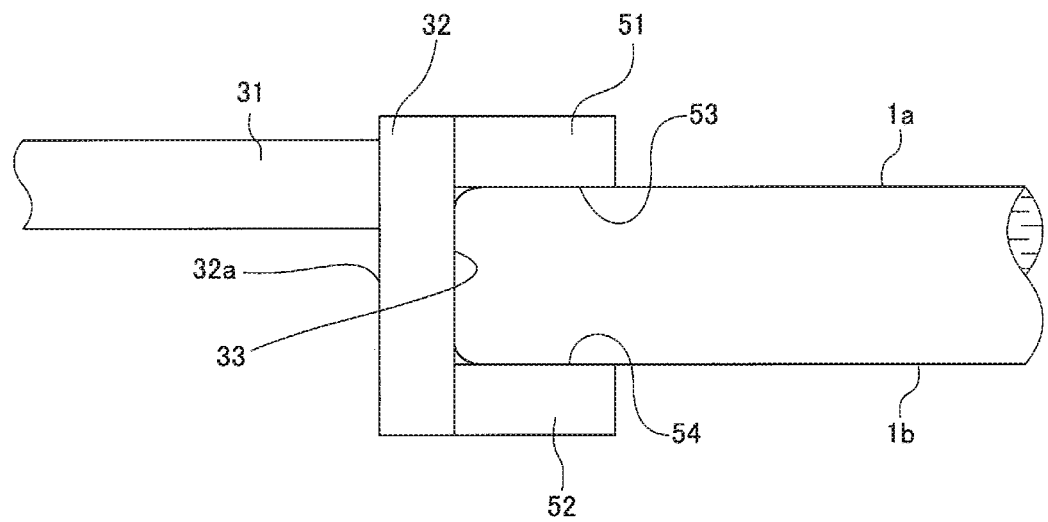

FLOOD PREVENTION DEVICE

CROSS-REFERENCE TO RELATED APPLICATIONS

This Application is the U.S. National Stage of PCT/JP2017/045296, filed Dec. 18, 2017, which claims priority to Japanese Patent Application No. 2017-002225, filed Jan. 11, 2017, the contents of each are incorporated herein by reference in entirety.

TECHNICAL FIELD

The present invention relates to a flood prevention device which contains a technique of protecting important facilities such as factories and buildings or sections from flood.

BACKGROUND ART

Various flood control measures are available in the related art. For example, tubular water bags as portable flood prevention materials are serially laid, temporarily building a flood prevention wall.

For example, a tubular water bag is described in Patent Literature 1. The water bag includes a long main tube and two or more sub tubes. The main tube and the sub tubes are filled with water, and then sand is continuously charged into the tubes while water is drained from the tubes.

Moreover, in Patent Literature 2, a flood proof fence is disclosed as a portable flood prevention material. The fence includes flood panels attached between spaced poles so as to prevent intrusion of flood and tsunami. The poles have vertical grooves and the poles are spaced with the grooves opposed to each other.

Furthermore, a floating flap gate is described in Patent Literature 3. The flap gate is installed at an opening or an inlet/outlet that is closed to block a water flow. The flap gate has a gate leaf whose distal end rises and swings with respect to the proximal end serving as the center of rotation.

CITATION LIST

Patent Literatures

Patent Literature 1: JPH11-256553A
Patent Literature 2: JP6018460B
Patent Literature 3: JP5580785B

DISCLOSURE OF THE INVENTION

Technical Problem

Flood is a whether disaster that occurs at a time and a location that are predictable to a certain degree. Thus, when flood is predicted, the foregoing portable flood prevention materials including the tubular water bag and the flood proof fence can be installed as a precaution at a location where any permanent flood prevention facilities are not constructed.

For example, tubular water bags normally stored in a storehouse or the like are installed in a period of several hours to several days. Thus, sufficient time is necessary for the installation. For example, three days before the arrival of a typhoon, tubular water bags are installed in advance around public facilities such as a hospital and an evacuation site and important infrastructures such as a power plant, thereby temporarily protecting target facilities from a flood disaster.

However, the portable flood prevention materials such as tubular water bags are disposed around a target facility and thus block access to the target facility after being installed. Thus, the tubular water bags installed sufficiently before the arrival of a typhoon lead to difficulty in accessing the target facility during the installation. This may result in an adverse effect if the target facility is a hospital or the like.

The present invention has been devised to solve the problem. An object of the present invention is to provide a flood prevention device that allows access to a target facility even if portable flood prevention materials such as tubular water bags are installed.

Solution to Problem

In order to solve the problem, a flood prevention device according to the present invention includes a gate device constituting a passage between a flood prevention area and an outside area, and a portable flood prevention material that separates the flood prevention area and the outside area with the gate device, the gate device having a side wall corresponding to one end of the portable flood prevention material.

In the flood prevention device according to the present invention, the portable flood prevention material is one of a tubular water bag, a panel, a block, and a sandbag.

In the flood prevention device according to the present invention, the gate device includes a storage on the side wall, the storage storing the portable flood prevention material.

In the flood prevention device according to the present invention, the gate device has a watertight surface on the side wall, the watertight surface stopping water between the side wall and the portable flood prevention material.

In the flood prevention device according the present invention, the portable flood prevention material includes a tubular water bag, and the gate device includes a watertight member on the side wall, the watertight member being connectable to or separable from a surface of the tubular water bag, the surface facing the outside area, the watertight member having a watertight surface for stopping water between the watertight member and the tubular water bag.

In the flood prevention device according to the present invention, the portable flood prevention material includes a tubular water bag, and the gate device includes a joint hole on the side wall, the joint hole allowing insertion of one end of the tubular water bag and having an inner surface constituting a watertight surface for stopping water between the side wall and the tubular water bag.

In the flood prevention device according to the present invention, the portable flood prevention material includes a tubular water bag, and the gate device includes a joint hole on the side wall, the joint hole allowing insertion of one end of the tubular water bag and having an inner surface constituting a watertight surface for stopping water between the side wall and the tubular water bag.

In the flood prevention device according to the present invention, the portable flood prevention material includes a tubular water bag, and the gate device includes the side wall and a pair of watertight walls opposed to each other with the tubular water bag interposed between the watertight walls, the first watertight wall having a first watertight surface for stopping water between a first surface of the tubular water bag and the first watertight wall, the first surface facing the flood prevention area, the second watertight wall having a second watertight surface for stopping water between a second surface of the tubular water bag and the second watertight wall, the second surface facing the outside area.

In the flood prevention device according to the present invention, the portable flood prevention material includes a tubular water bag, and the gate device includes the side wall and a watertight wall and an engagement part that are opposed to each other with the tubular water bag interposed between the watertight wall and the engagement part, the watertight wall having a watertight surface for stopping water between the tubular water bag and the watertight wall, the tubular water bag having one end interposed between the engagement part and the watertight wall.

In the flood prevention device according to the present invention, the portable flood prevention material includes a tubular water bag, and the tubular water bag has a water bag height larger than a height of a gate leaf of the gate device, the water bag height being 1.11 times to 1.67 times as large as the height of the gate leaf.

In the flood prevention device according to the present invention, the portable flood prevention material includes a panel, and the gate device includes guide rails on the side wall, the guide rails allowing insertion of the panel, the gate device having a watertight surface for stopping water between the guide rails and the panel.

Advantageous Effects of Invention

As has been discussed, the present invention can provide a flood prevention device that allows access to a target facility even if a portable flood prevention material is installed.

BRIEF DESCRIPTION OF THE DRAWINGS

FIG. 1 is a plan view illustrating a flood prevention device according to an embodiment of the present invention.

FIG. 13 is a perspective view illustrating a flood prevention device according to another embodiment of the present invention.

FIG. 14 is a plan view illustrating the flood prevention device.

EMBODIMENTS

Embodiments of the present invention will be described below in accordance with the accompanying drawings. A tubular water bag 1 in FIG. 28 will be described as an example of a portable flood prevention material. The portable flood prevention material in the present invention is not limited to the tubular water bag 1 and may be a panel, a block, or a sandbag.

Figure 28:
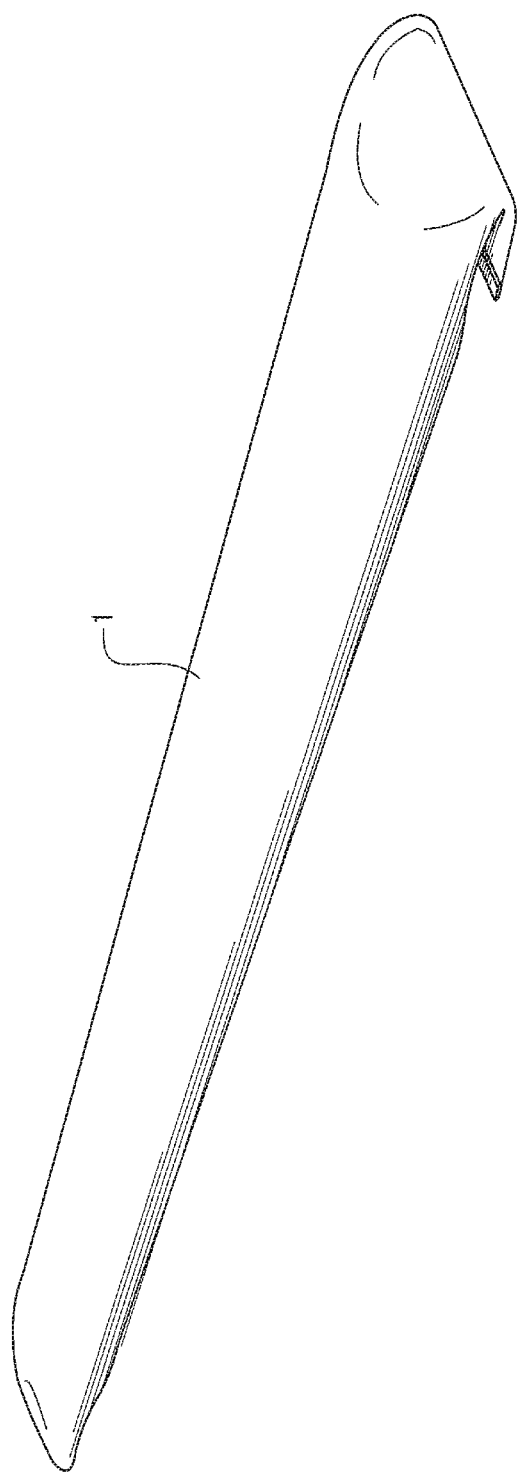
FIG. 28 is a perspective view illustrating the tubular water bag.

The tubular water bag 1 in FIG. 28 is a flexible tube made of a resin material to which waterproofing is applied. The tubular water bag 1 has a width of several tens centimeters and a length of several tens meters and includes a water supply/drain valve. The tubular water bag 1 being installed is filled with water to expand with folded ends, so that the tubular water bag 1 is used as a flood prevention wall. Two or more tubular water bags 1 may be stacked and bound so as to adjust the height of a dam body and the level of stopped water as a flood prevention wall.

Gate devices are available in various forms. For example, the gate devices include a roller gate with a gate leaf vertically moving so as to open and close, a sliding gate with a gate leaf reciprocating on a rail so as to open and close, a miter gate with double gate leaves pivoting about hinges with vertical axes so as to open and close, and a flap gate with a gate leaf pivoting about a hinge so as to open and close in a flapping manner. In the present embodiment, the gate device is a flap gate.

Figure 2:
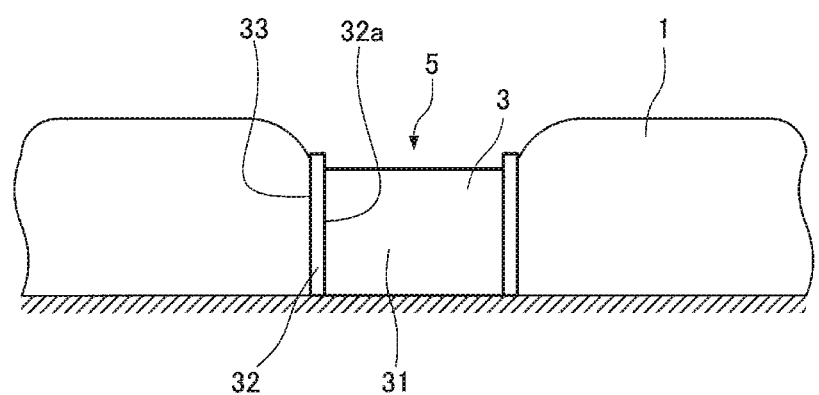
FIG. 2 is a front view illustrating the flood prevention device.

In FIGS. 1 and 2, a flood prevention area 2 is surrounded by the tubular water bag 1 and a flap gate 3 so as to be separated from an outside area 4. The flap gate 3 is disposed at an opening 5 serving as a passage between the flood prevention area 2 and the outside area 4.

The flap gate 3 of the present embodiment includes a gate leaf 31 and a pair of side walls 32 whose inner surfaces are opposed to each other with the gate leaf 31 interposed therebetween. The inner surface of the side wall 32 forms a vertical surface 32a with respect to the gate leaf 31. The gate leaf 31 flaps between the vertical surfaces 32a of the side walls 32. The gate leaf 31 is raised into a closed state and is laid into an opened state. When the gate leaf 31 is closed, the side walls 32 act as dam body with the gate leaf 31. Moreover, the side wall 32 forms a joining part joined to the tubular water bag 1 and has an outer surface corresponding one end of the tubular water bag 1 and forming a side-wall watertight surface 33. The side-wall watertight surface 33 stops water between the side wall 32 and the tubular water bag 1.

In the present embodiment, the side-wall watertight surface 33 of the side wall 32 is linear in the plan view of the side wall 32. The side-wall watertight surface 33 may be shaped like an arc or a letter V.

Figure 3:
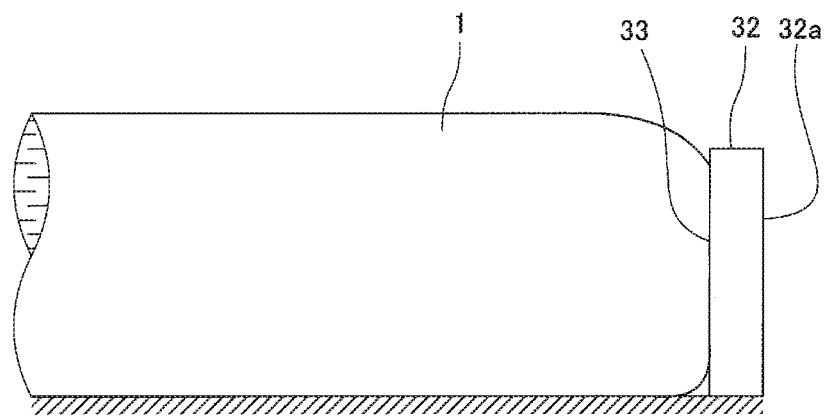
FIG. 3 is a schematic view illustrating the principal part of the flood prevention device.
Figure 4:
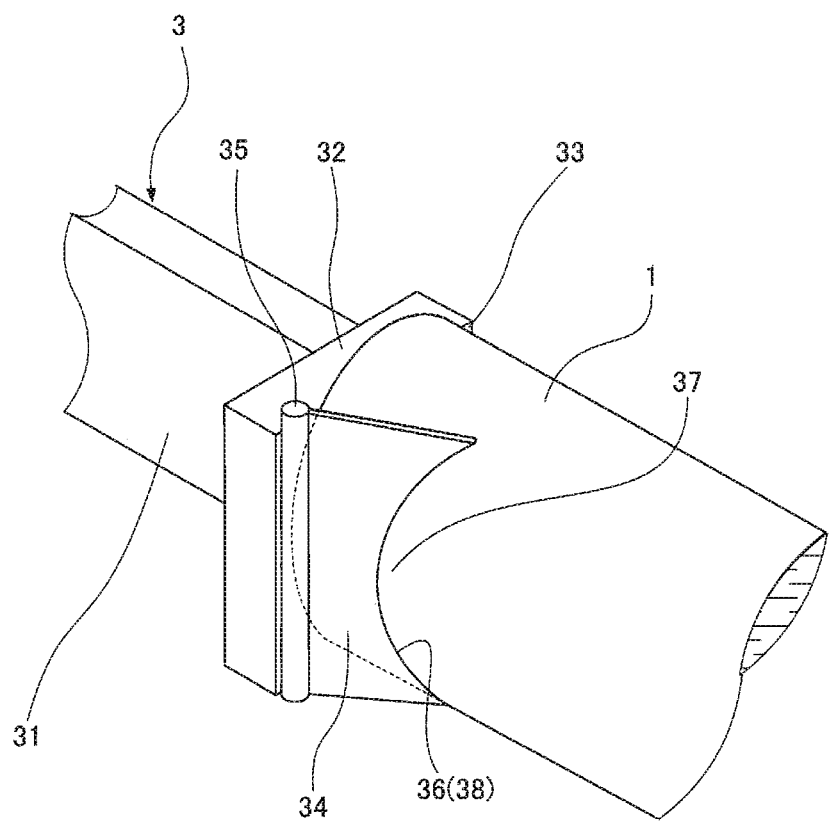
FIG. 4 is a perspective view illustrating a flood prevention device according to another embodiment of the present invention.

As shown in FIG. 3, a hydrostatic pressure applied into the tubular water bag 1 presses the tubular water bag 1 into contact with the side-wall watertight surface 33 of the side wall 32 of the flap gate 3, so that water is stopped between the tubular water bag 1 and the side-wall watertight surface 33.

In this configuration, the flap gate 3 is installed in advance at a position where the inlet/outlet of the flood prevention area 2 is to be placed. Each time a flood control measure is necessary, the portable tubular water bag 1 is installed after being conveyed from a storehouse or the like where the tubular water bag 1 is stored under normal conditions.

In this way, the flap gate 3 that cannot protect the rear area alone and the portable tubular water bag 1 are combined to construct a flood prevention wall. This allows the flap gate 3 constituting a section of the flood prevention wall to ensure a passage immediately before the occurrence of flood; meanwhile, other sections of the flood prevention wall can be constructed in advance by the tubular water bag 1.

Hence, high cost is not necessary unlike in the construction of a flood prevention wall with, for example, civil engineering structures, so that the flood prevention wall can be inexpensively constructed so as to reduce the cost of measures for flood damage.

Furthermore, the passage between the flood prevention area 2 and the outside area 4 can be obtained by the flap gate 3 even after the installation of the tubular water bag 1, thereby preventing the installation of the tubular water bag 1 from blocking access to a building or a section in the flood prevention area 2. This can leave a sufficient installation time for the tubular water bag 1, which requires a long installation time, thereby removing restrictions on the time for installing the tubular water bag 1.

FIGS. 4, 5A, 5B, and 5C illustrate another embodiment of the present invention. Members that perform the same operations as those of the foregoing embodiment are indicated by the same reference numerals and the explanation thereof is omitted.

In this configuration, a plate 34 constituting a watertight member is provided at the side wall 32 of the flap gate 3 so as to be adjacent to the outside area 4.

The plate 34 pivots about the axis of a vertically disposed rotation shaft 35 so as to connect to and separate from the tubular water bag 1. The plate 34 has a notch 37 on a contact side 36 to be placed on the tubular water bag 1. The notch 37 is shaped according to the outside shape of the tubular water bag 1 filled with water. The side edge of the notch 37 forms a plate water-stopping surface 38 to be placed on the tubular water bag 1. Furthermore, a fixing member 39 is provided on one end of the tubular water bag 1. The fixing member 39 includes a tensile member, e.g., a band or a rope and an anchored bracket. The fixing member 39 restricts a horizontal movement or a rotation of the tube end, thereby preventing the tubular water bag 1 from being moved by the hydrostatic pressure of water in the outside area 4 in the event of flood.

In addition to a tension generated by the band or a rope, a horizontal force generated by the tube may be supported by a shearing force acting on a pile or a frame as long as they can obtain a reaction force against the horizontal force. Not only the anchored bracket, but also the weight of the fixing member may be resistant to the horizontal force.

Figure 5A:
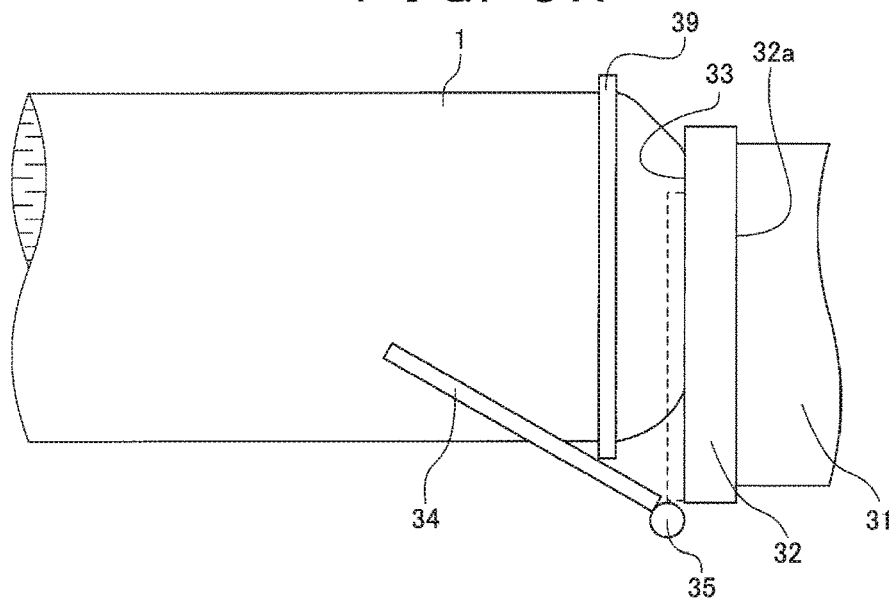
FIG. 5A is a plan view illustrating the flood prevention device.
Figure 5B:
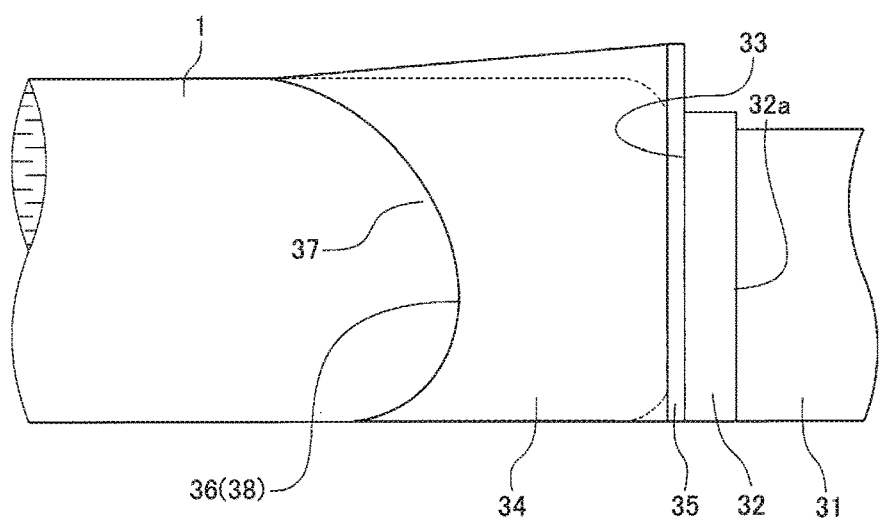
FIG. 5B is a front view illustrating the flood prevention device.

In this configuration, as illustrated in FIGS. 5A and 5B, a hydrostatic pressure applied into the tubular water bag 1 presses the tubular water bag 1 into contact with the side-wall watertight surface 33 of the side wall 32 of the flap gate 3, thereby stopping water between the tubular water bag 1 and the side-wall watertight surface 33. Moreover, when receiving a hydrostatic pressure of water pouring into the outside area 4 in the event of flood, the plate 34 is pressed with the plate water-stopping surface 38 into contact with the outer surface of the tubular water bag 1, which is filled with water, so as to face the outside area 4, achieving the function of stopping water. The plate 34 acts as a part of a flood prevention wall.

In this way, the tubular water bag 1 is pressed into contact with the side-wall watertight surface 33 of the side wall 32 by a hydrostatic pressure in the tubular water bag 1 so as to perform the function of stopping water and the plate 34 is pressed with the plate water-stopping surface 38 into contact with the tubular water bag 1 by a hydrostatic pressure of water in the outside area 4 so as to perform the function of stopping water. This can stop water in the two stages at the two hydrostatic pressures, thereby reducing water leakage from the outside area 4 to the flood prevention area 2.

In the present embodiment, however, the contact between the tubular water bag 1 and the side-wall watertight surface 33 of the side wall 32 is not always necessary. Water can be sufficiently stopped by pressing the plate 34 with the plate water-stopping surface 38 into contact with the tubular water bag 1.

Figure 5C:
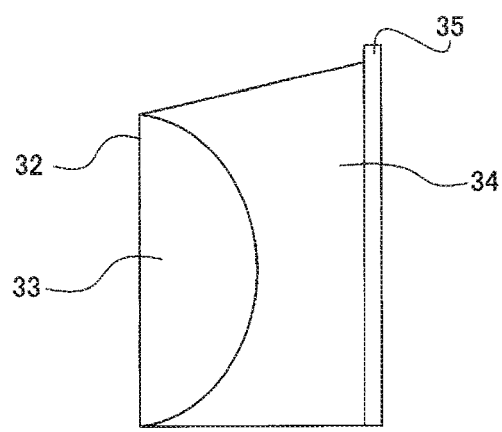
FIG. 5C is a side view illustrating the flood prevention device.
Figure 6:
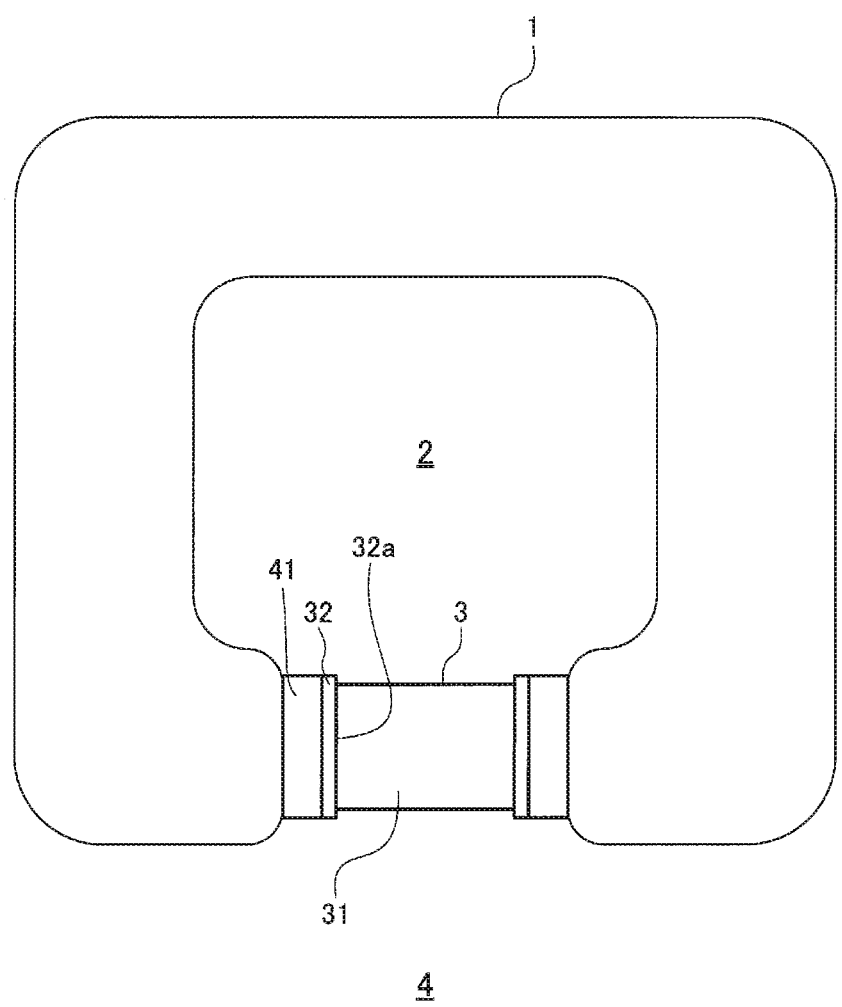
FIG. 6 is a plan view illustrating a flood prevention device according to another embodiment of the present invention.
Figure 7A:
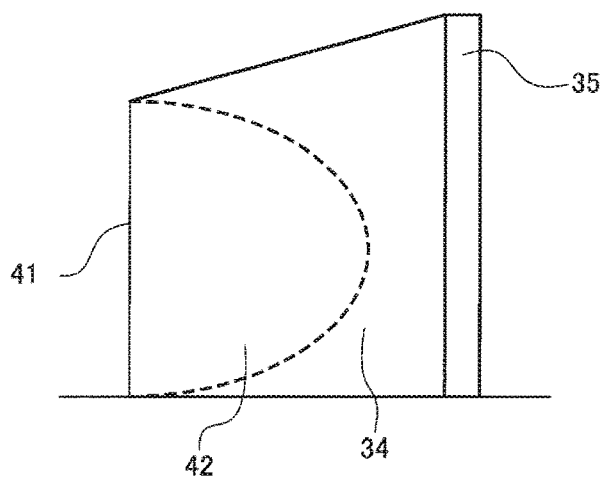
FIG. 7A is a side view illustrating the flood prevention device with a concealing member.
Figure 7B:
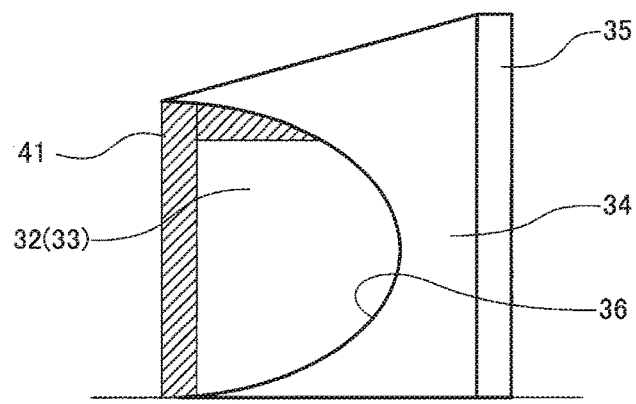
FIG. 7B is a side view illustrating the flood prevention device after the concealing member is removed.
Figure 7C:
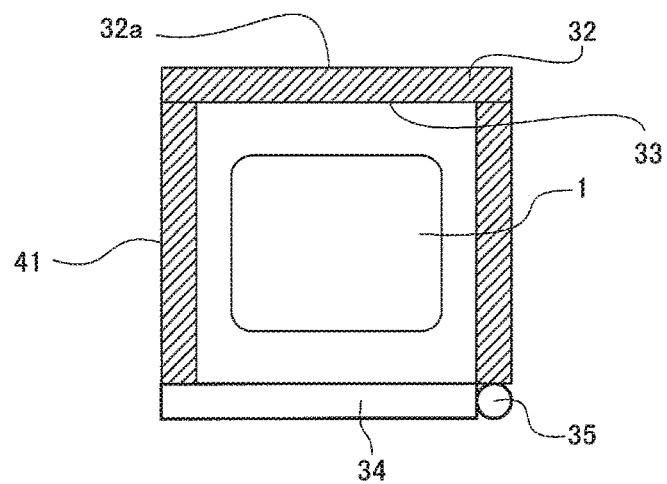
FIG. 7C is a top cross-sectional view illustrating the flood prevention device.

As illustrated in FIG. 5C, under normal conditions where the tubular water bag 1 is not installed, the plate 34 is disposed along the side-wall watertight surface 33 of the side wall 32 of the flap gate 3, achieving a space saving.

FIGS. 6, 7A, 7B, 7C, 8A, and 8B illustrate another embodiment of the present invention. Members that perform the same operations as those of the foregoing embodiment are indicated by the same reference numerals and the explanation thereof is omitted.

In this configuration, a storage 41 for storing the tubular water bag 1 is provided on a side wall 32. The side wall 32 constitutes a part of the wall of the storage 41 and a side-wall watertight surface 33 is exposed into the storage 41. A plate 34 acts as a door of the opening of the storage 41. Under normal conditions, the tubular water bag 1 in a dewatered state is folded and stored in the storage 41. A concealing member 42 is attached to a notch 37 of the plate 34 so as to finish the door.

In the event of flood, the tubular water bag 1 is pulled out of the storage 41 and is installed so as to construct a flood prevention wall with the flap gate 3.

Figure 8A:
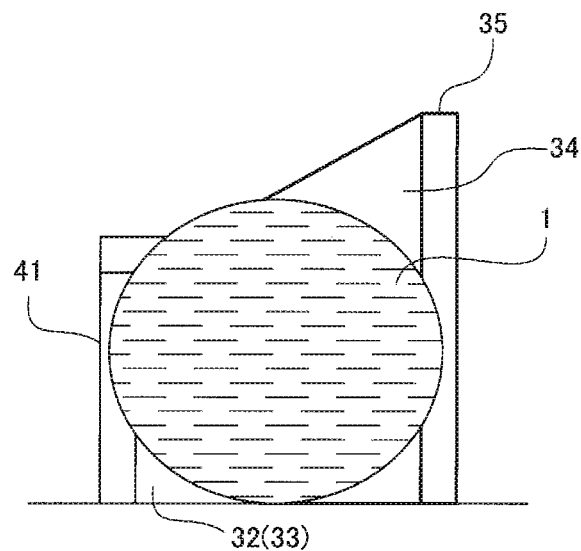
FIG. 8A is a cross-sectional view of the flood prevention device.
Figure 8B:
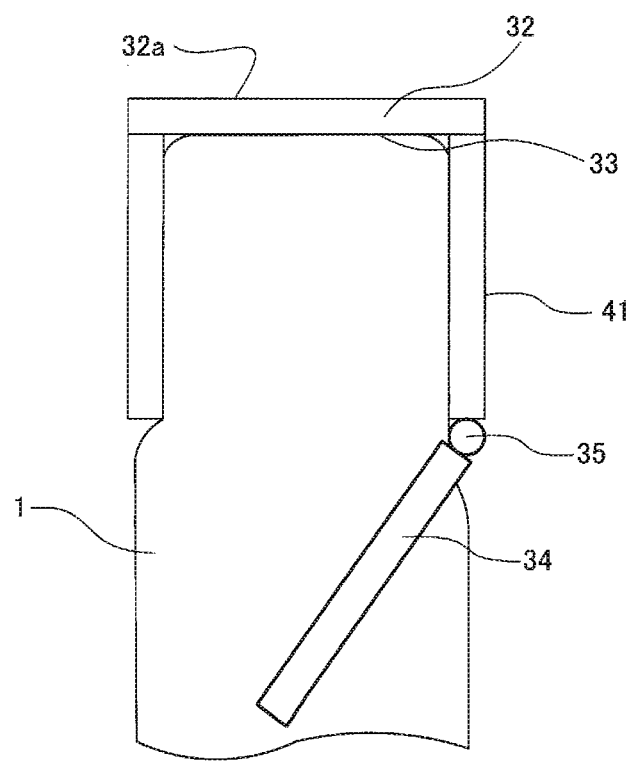
FIG. 8B a plan view of the flood prevention device.

In this configuration, as illustrated in FIG. 8B, a hydrostatic pressure applied into the tubular water bag 1 presses the tubular water bag 1 into contact with the side-wall watertight surface 33 of the side wall 32 of the flap gate 3, thereby stopping water between the tubular water bag 1 and the side-wall watertight surface 33. Moreover, the tubular water bag 1 is pressed into contact with the inner surface of the storage 41, so that water is stopped between the tubular water bag 1 and the inner surface of the storage 41. Moreover, when receiving a hydrostatic pressure of water pouring into the outside area 4 in the event of flood, the plate 34 is pressed with a plate water-stopping surface 38 into contact with the outer surface of the tubular water bag 1, which is filled with water, so as to face the outside area 4, achieving the function of stopping water. The plate 34 acts as a part of the flood prevention wall.

In this way, the tubular water bag 1 is pressed into contact with the side-wall watertight surface 33 of the side wall 32 and the inner surface of the storage 41 by a hydrostatic pressure in the tubular water bag 1 so as to perform the function of stopping water and the plate 34 is pressed with the plate water-stopping surface 38 into contact with the tubular water bag 1 by a hydrostatic pressure of water in the outside area 4 so as to perform the function of stopping water. This can stop water in the two stages at the two hydrostatic pressures, thereby reducing water leakage from the outside area 4 to the flood prevention area 2.

The tubular water bag 1 is normally stored in the storage 41 provided on the side wall 32. Thus, the tubular water bag 1 being installed can be quickly pulled out to construct the flood prevention wall.

In this configuration, one end of the tubular water bag 1 can be fixed in advance to the side-wall watertight surface 33 exposed on the rear end of the storage 41. In this case, the tubular water bag 1 can be disposed only by drawing the free end of the tubular water bag 1 from the storage 41.

Figure 9:
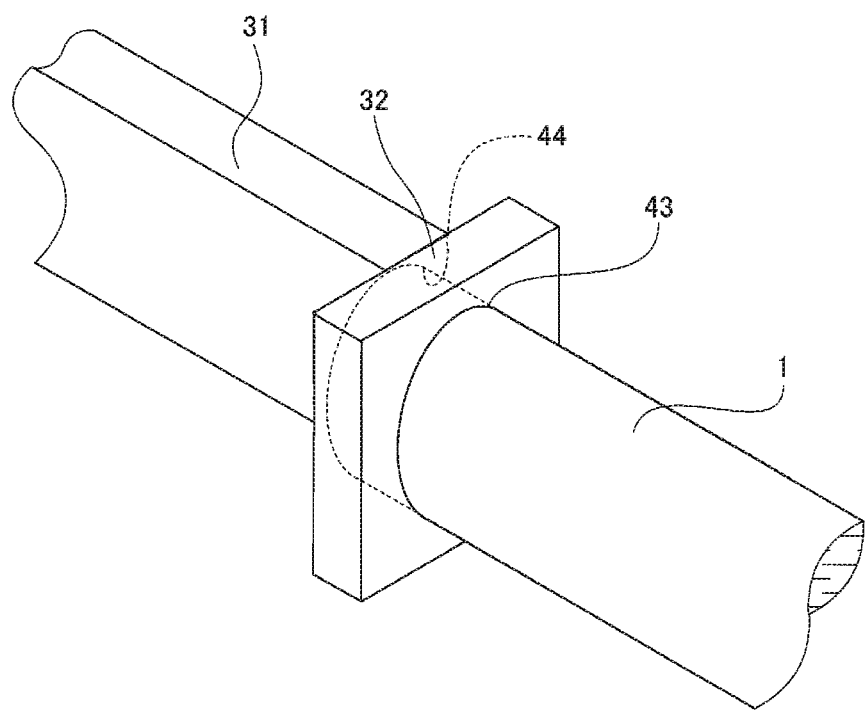
FIG. 9 is a perspective view illustrating a flood prevention device according to another embodiment of the present invention.
Figure 10:
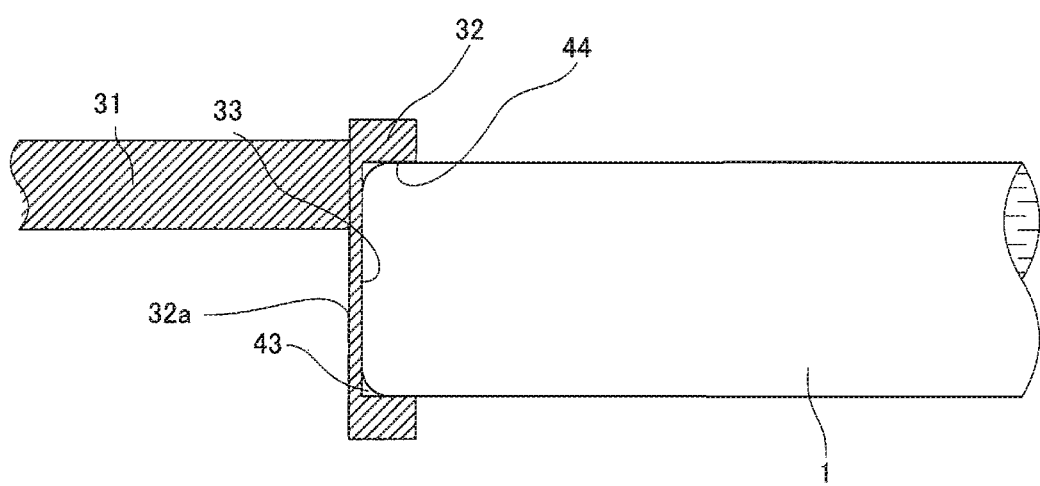
FIG. 10 is a top cross-sectional view illustrating the flood prevention device according to the embodiment.

FIGS. 9 and 10 illustrate another embodiment of the present invention. Members that perform the same operations as those of the foregoing embodiments are indicated by the same reference numerals and the explanation thereof is omitted.

In this configuration, the side wall 32 of the flap gate 3 has a closed-end joint hole 43 where one end of the tubular water bag 1 can be inserted. The inner surface of the joint hole 43 constitutes a joint-hole watertight surface 44.

In the installation of the tubular water bag 1, one end of the tubular water bag 1 is inserted into the joint hole 43 of the side wall 32 and then the tubular water bag 1 is filled with water so as to be joined to the side wall 32.

In this state, the tubular water bag 1 is pressed to the joint-hole watertight surface 44 on the inner surface of the joint hole 43 by a hydrostatic pressure in the tubular water bag 1, achieving a sealing function. Moreover, the engagement between the side wall 32 and the tubular water bag 1 via the joint hole 43 fixes one end of the tubular water bag 1 to the flap gate 3, thereby preventing a hydrostatic pressure of the outside area 4 from moving the tubular water bag 1.

Figure 11:
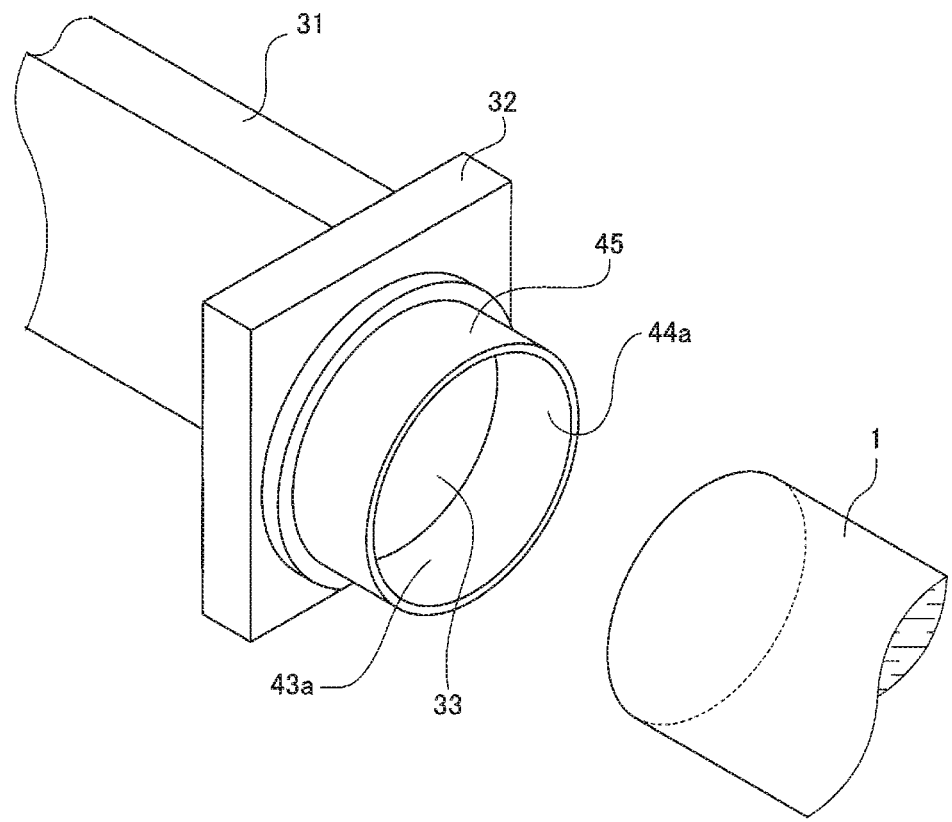
FIG. 11 is a perspective view illustrating a flood prevention device according to another embodiment of the present invention.
Figure 12:
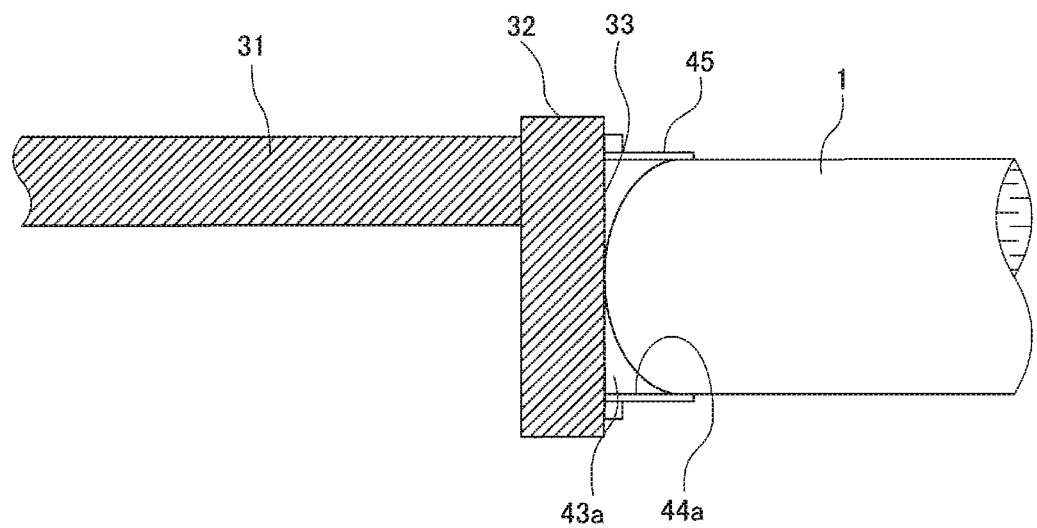
FIG. 12 is a top cross-sectional view illustrating the flood prevention device.

As illustrated in FIGS. 11 and 12, the side wall 32 of the flap gate 3 may have a ring member 45 as a joint member. The ring member 45 is detachably attached to the side wall 32 and has a joint hole 43a that is a through hole. The inner surface of the ring member 45 constitutes a joint-hole watertight surface 44a.

In this configuration, the tubular water bag 1 inserted into the joint hole 43a is pressed into contact with the joint-hole watertight surface 44a of the joint hole 43a by a hydrostatic pressure in the tubular water bag 1, achieving a sealing function. Moreover, the engagement between the ring member 45 and the tubular water bag 1 fixes one end of the tubular water bag 1 to the flap gate 3, thereby preventing a hydrostatic pressure of the outside area 4 from moving the tubular water bag 1. Under normal conditions, the ring member 45 is stored after being removed from the side wall 32, achieving a space saving.

FIGS. 13 and 14 illustrate another embodiment of the present invention. Members that perform the same operations as those of the foregoing embodiments are indicated by the same reference numerals and the explanation thereof is omitted.

In this configuration, the side wall 32 of the flap gate 3 has a first water-stopping wall 51 and a second water-stopping wall 52 that are opposed to each other with one end of the tubular water bag 1 interposed therebetween. The first water-stopping wall 51 is opposed to a side 1a of the tubular water bag 1, the side 1a facing the flood prevention area 2. The inner surface of the first water-stopping wall 51 constitutes a watertight surface 53. The second water-stopping wall 52 is opposed to a side 1b of the tubular water bag 1, the side 1b facing the outside area 4. The inner surface of the second water-stopping wall 52 constitutes a watertight surface 54.

In this configuration, hydrostatic pressure applied into the tubular water bag 1 presses one end of the tubular water bag 1 into contact with the side-wall watertight surface 33 of the side wall 32 of the flap gate 3, thereby stopping water between the tubular water bag 1 and the side-wall watertight surface 33. Furthermore, a hydrostatic pressure applied into the tubular water bag 1 presses the outer surface of the tubular water bag 1 into contact with the watertight surface 53 of the first water-stopping wall 51 and the watertight surface 54 of the second water-stopping wall 52. Thus, water is stopped in multiple stages between the tubular water bag 1 and the side wall 32, sufficiently performing the function of stopping water. Moreover, there is an open space between the first water-stopping wall 51 and the second water-stopping wall 52, thereby easily disposing the tubular water bag 1 between the first water-stopping wall 51 and the second water-stopping wall 52.

Figure 15:
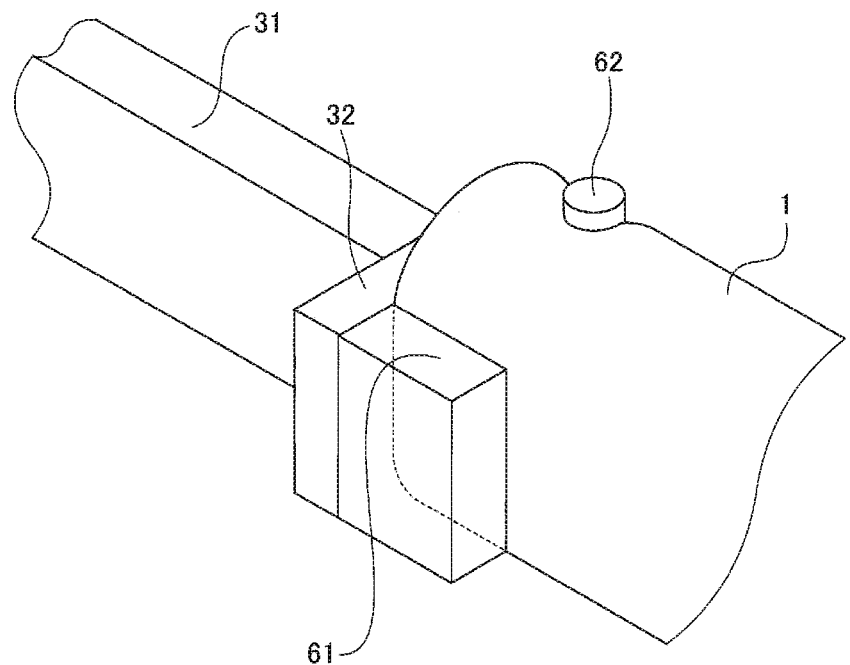
FIG. 15 is a perspective view illustrating a flood prevention device according to another embodiment of the present invention.
Figure 16:
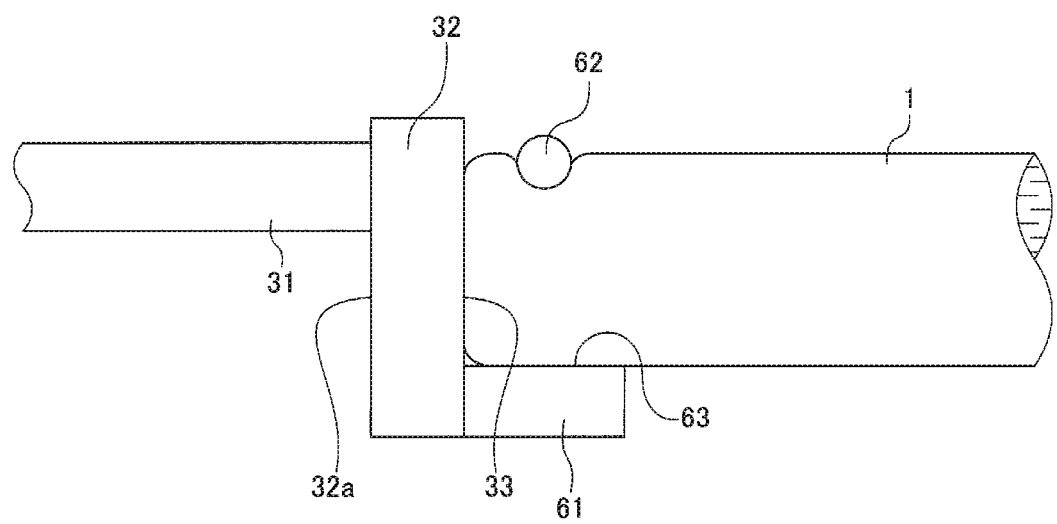
FIG. 16 is a plan view illustrating the flood prevention device.

FIGS. 15 and 16 illustrate another embodiment of the present invention. Members that perform the same operations as those of the foregoing embodiments are indicated by the same reference numerals and the explanation thereof is omitted.

In this configuration, the side wall 32 of the flap gate 3 has a watertight wall 61 and an engagement part 62 that are opposed to each other with one end of the tubular water bag 1 interposed therebetween. The engagement part 62 is opposed to a side 1a that faces the flood prevention area 2 of the tubular water bag 1. The watertight wall 61 is opposed to a side 1*b* that faces the outside area 4 of the tubular water bag 1. The inner surface of the watertight wall 61 constitutes a watertight surface 63.

In this configuration, a hydrostatic pressure applied into the tubular water bag 1 presses one end of the tubular water bag 1 into contact with the side-wall watertight surface 33 of the side wall 32 of the flap gate 3, thereby stopping water between the tubular water bag 1 and the side-wall watertight surface 33. Furthermore, a hydrostatic pressure applied into the tubular water bag 1 presses the outer surface of the tubular water bag 1 into contact with the watertight surface 62 of the watertight wall 61.

Thus, water is stopped in multiple stages between the tubular water bag 1 and the side wall 32, sufficiently performing the function of stopping water.

The tubular water bag 1 filled with water is installed with a constricted part at the engagement part 62. One end of the tubular water bag 1 is interposed between the watertight wall 61 and the engagement part 62. Thus, the tubular water bag 1 is constricted at the engagement part 62 so as to securely fix one end of the tubular water bag 1 to the flap gate 3.

The watertight wall 61 and the engagement part 62 can be provided at opposite positions.

The relationship between the heights of the flap gate 3 and the tubular water bag 1 according to the foregoing embodiments will be described below.

Figure 17:
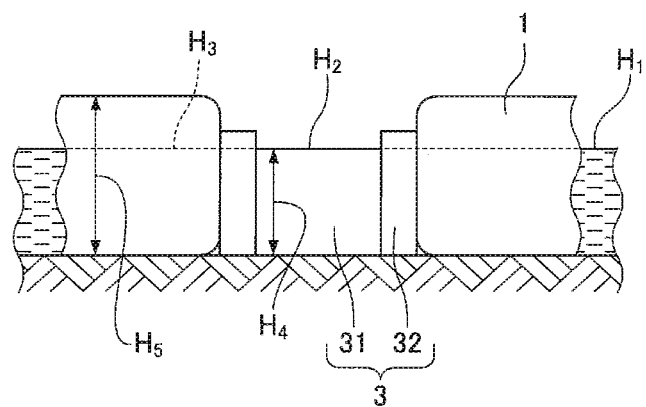
FIG. 17 is a front view illustrating the relationship between the heights of a gate device and a tubular water bag in the flood prevention device according to the present invention.

As illustrated in FIG. 17, a set upper-limit water level (water stopping level) H2 of the flap gate 3 and a set upper-limit water level (water stopping level) H3 of the tubular water bag 1 are normally equal to an assumed upper-limit water level H1 of flood. Generally, the set upper-limit water level of the gate device is 100% of the height of the gate and the set upper-limit water level (water stopping level) H3 of the tubular water bag 1 is 60% to 90 of the height of the tubular water bag 1 filled with water. For example, if a water stopping level of 2.0 m is necessary, a height (a distance from the flat position to the standing position of the gate leaf 31) H4 of the gate leaf 31 of the flap gate 3 is set at 2.0 m and a height H5 of the tubular water bag 1 filled with water is set at 2.3 m to 3.4 m on the assumption that the water stopping level is 60% to 90% of the height H5 of the tubular water bag 1.

The height relationship can stop water up to the assumed upper limit water level H1 without excessively increasing the heights of the gate device 3 and the tubular water bag 1.

Moreover, the gate device 3 and the tubular water bag 1 are fixed in advance by using fixing structures described in the embodiments. If a water level rises close to the assumed upper-limit water level H1, the function of stopping water may deteriorate at a contact between the gate device 3 and the tubular water bag 1 as compared with the function of stopping water by the gate device 3 and the tubular water bag 1. However, by using the fixing structure for fixing the gate device 3 and the tubular water bag 1, the fixing structure can more securely obtain the side-wall watertight surface 33. Thus, the effect of stopping water can be expected with higher reliability than in the case where the side-wall watertight surface 33 to the gate device 3 is obtained by the weight of the tubular water bag 1.

Figure 18:
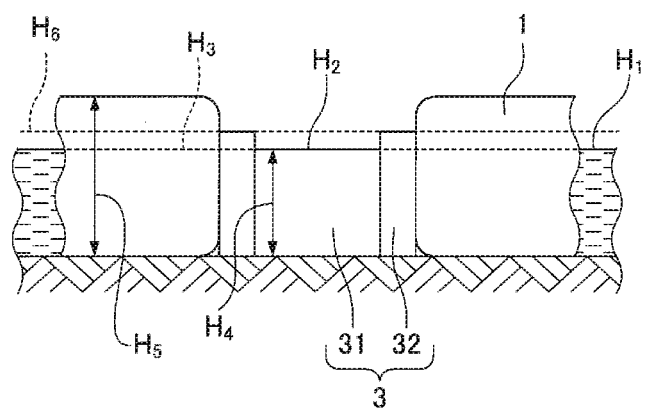
FIG. 18 is a front view illustrating the relationship between the heights of the gate device and the tubular water bag in the flood prevention device.

As illustrated in FIG. 18, even if a flood level H6 in the event of flood exceeds the assumed upper-limit water level H1, the gate device 3 typically designed with a safety factor of, for example, about 1.5 times does not immediately topple over or slide. However, the tubular water bag 1 has a safety factor lower than that of the gate device and thus is likely to topple over or slide. Thus, the tubular water bag 1 is fixed to the gate device 3 so as to increase a proof stress against the external force of a tubular water bag 3, so that even if a flood level in the event of flood exceeds the assumed water level H1, the possibility of toppling over or sliding is reduced as compared with the tubular water bag 1 installed alone.

Figure 19:
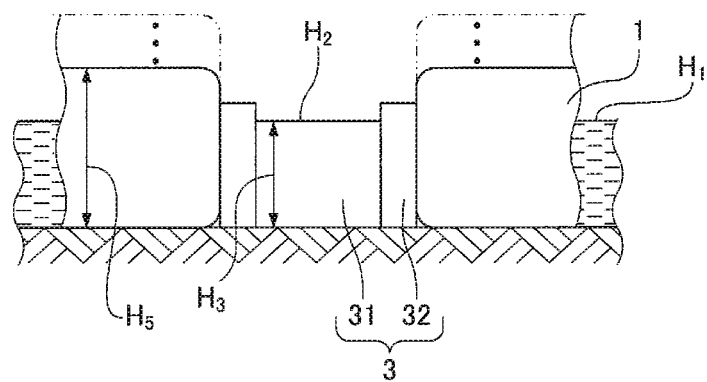
FIG. 19 is a front view illustrating the relationship between the heights of the gate device and the tubular water bag in the flood prevention device.

As illustrated in FIG. 19, if the set upper-limit water level (water stopping level) H2 of the flap gate 3 is equal to the assumed upper-limit water level H1 of flood, the water bag height H5 of the tubular water bag 1 filled with water is desirably 1.11 times to 1.67 times as large as the height H4 Of the gate leaf 31 of the flap gate 3.

Figure 20:
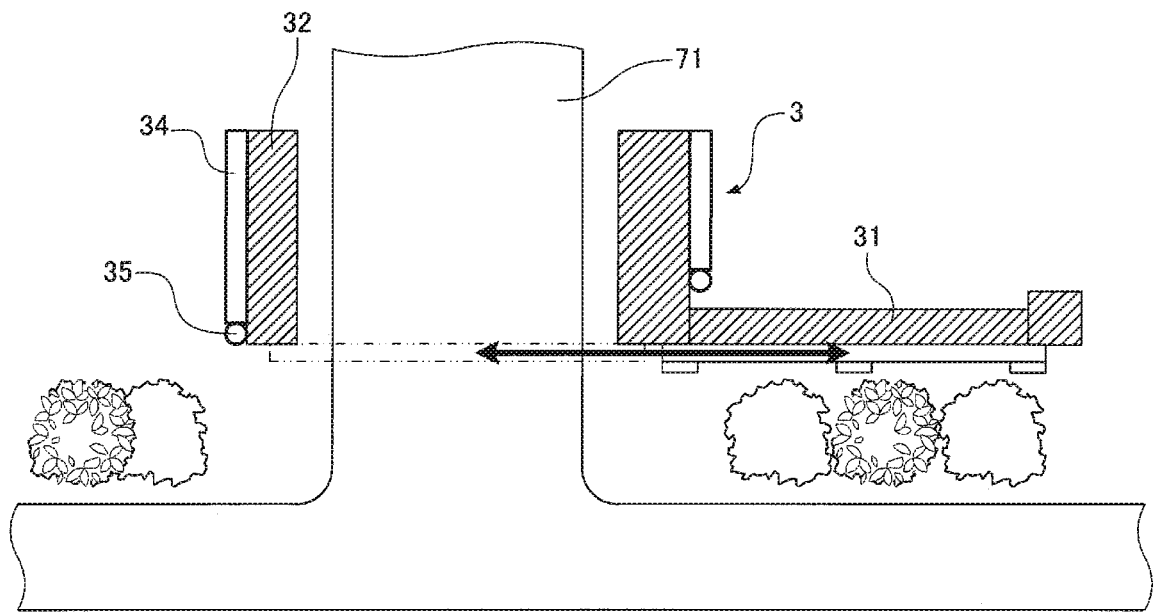
FIG. 20 is a plane view illustrating a flood prevention device before a tubular water bag is installed according to another embodiment of the present invention.
Figure 21:
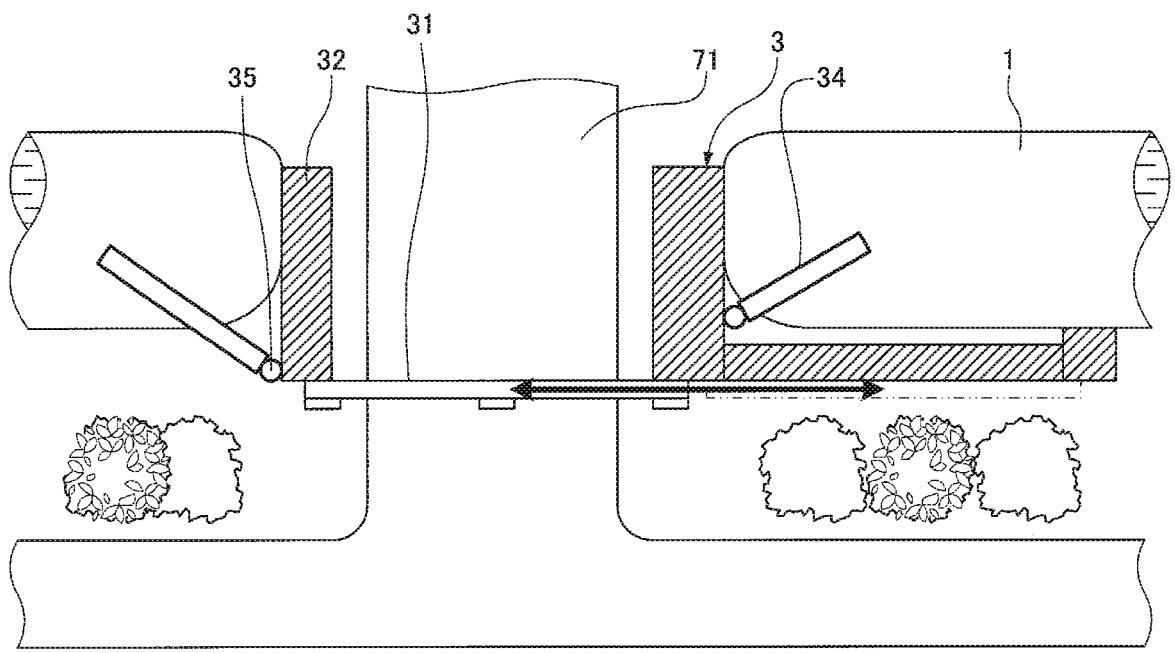
FIG. 21 is a plan view illustrating the flood prevention device after the tubular water bag is installed.

FIGS. 20 and 21 illustrate another embodiment of the present invention. Members that perform the same operations as those of the foregoing embodiments are indicated by the same reference numerals and the explanation thereof is omitted.

In this configuration, a sliding gate is used as a flap gate 3. The flap gate 3 is disposed across a road 71 leading to a flood prevention area 2, e.g., a factory site.

As illustrated in FIG. 20, a gate leaf 31 of the flap gate 3 is normally retracted to a position remote from the road 71 so as to open the flap gate 3. In the event of flood, the tubular water bag 1 is installed with the opened flap gate 3 and is placed into a standby state, ensuring access to the flood prevention area 2.

In the event of flood, as illustrated in FIG. 21, the flap gate 3 is closed by moving the gate leaf 31 of the flap gate 3 to a position where the road 71 is to be blocked, allowing the flap gate 3 to act as a flood prevention wall with the tubular water bag 1.

Figure 22:
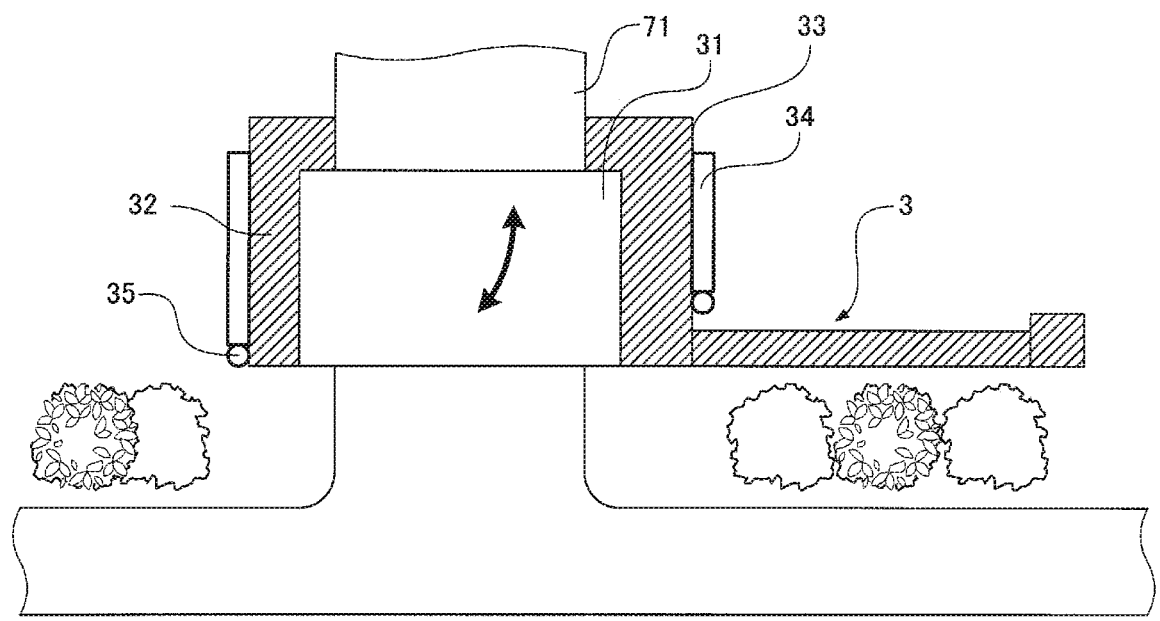
FIG. 22 is a plane view illustrating a flood prevention device before a tubular water bag is installed according to another embodiment of the present invention.
Figure 23:
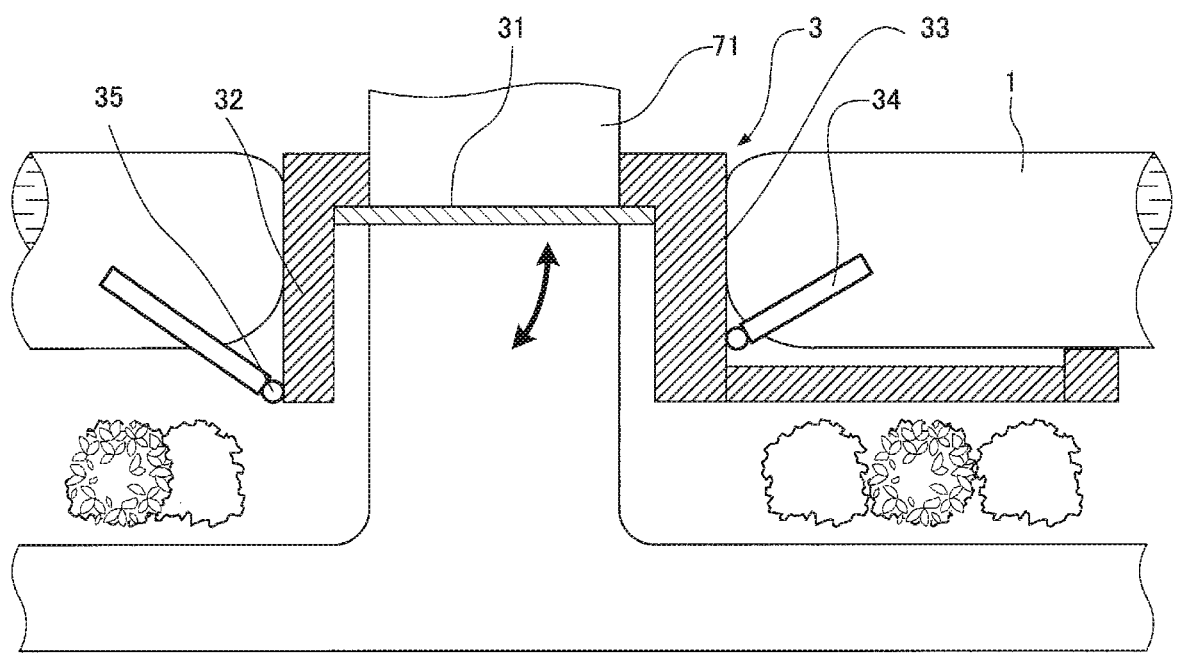
FIG. 23 is a plane view illustrating the flood prevention device after the tubular water bag is installed.
Figure 24:
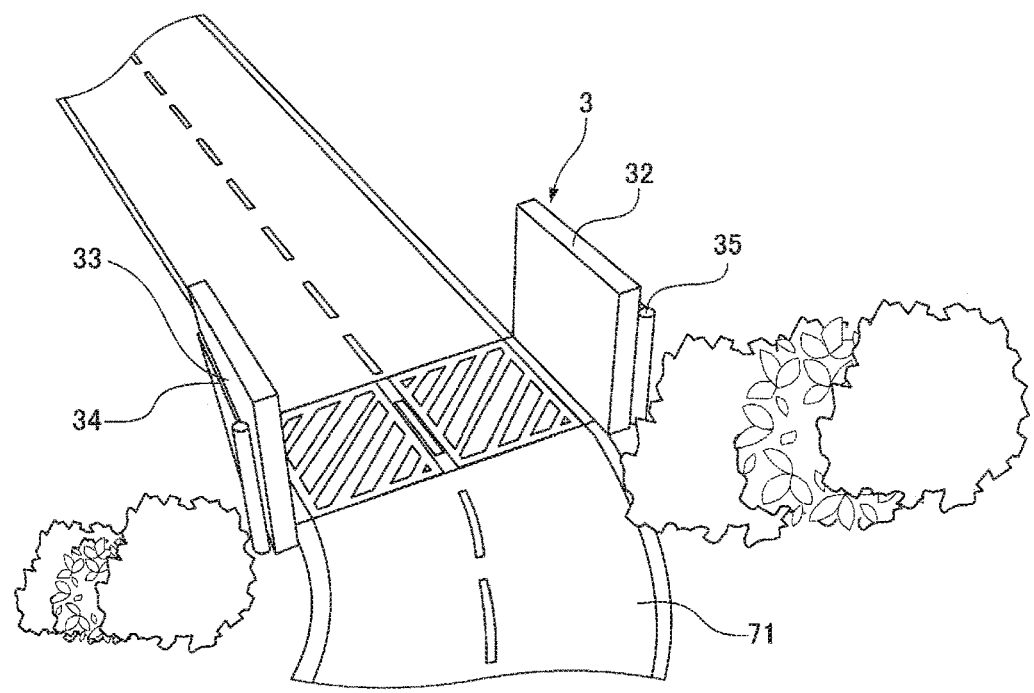
FIG. 24 is a perspective view illustrating the flood prevention device before the tubular water bag is installed.

FIGS. 22 to 24 illustrate another embodiment of the present invention. Members that perform the same operations as those of the foregoing embodiments are indicated by the same reference numerals and the explanation thereof is omitted.

In this configuration, a flap gate is used as a flap gate 3. The flap gate 3 has a gate leaf 32 that is disposed so as to flap on a road 71 leading to a flood prevention area 2, e.g., a factory site.

As illustrated in FIGS. 22 and 24, a gate leaf 31 of the flap gate 3 is normally laid on the road 71 so as tO open the flap gate 3. In the event of flood, the tubular water bag 1 is installed with the opened flap gate 3 and is placed into a standby state, ensuring access to the flood prevention area 2.

Figure 25:
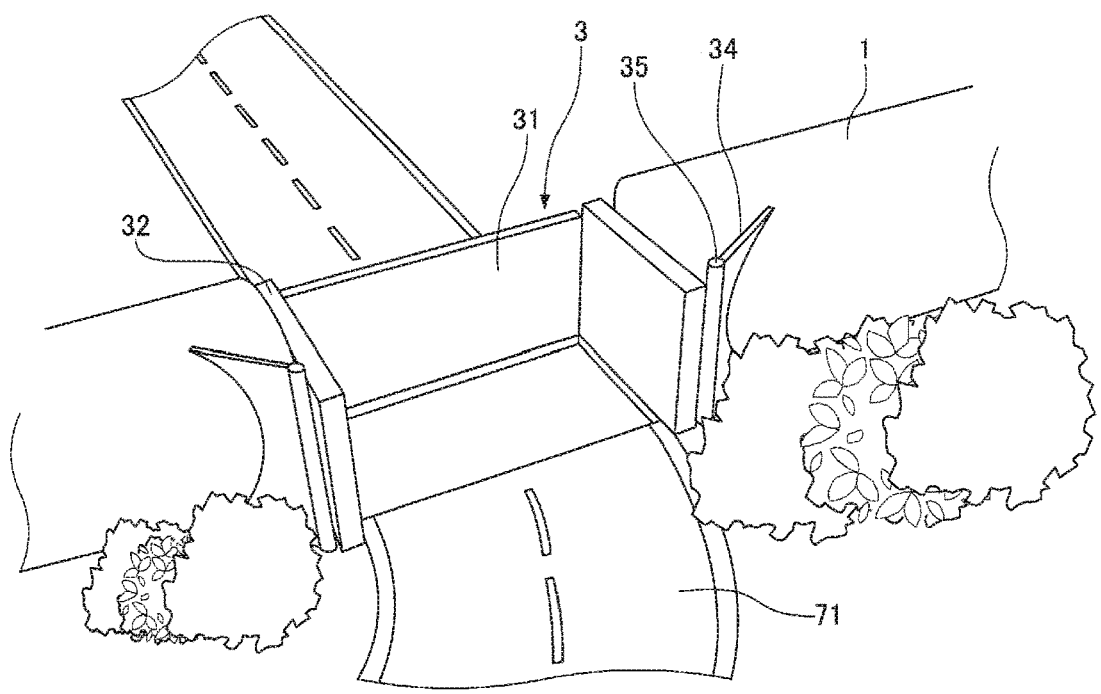
FIG. 25 is a perspective view illustrating the flood prevention device after the tubular water bag is installed.

In the event of flood, as illustrated in FIGS. 23 and 25, the flap gate 3 is closed by raising the gate leaf 31 of the flap gate 3 from the road 71, allowing the flap gate 3 to act as a flood prevention wall with the tubular water bag 1.

Figure 26:
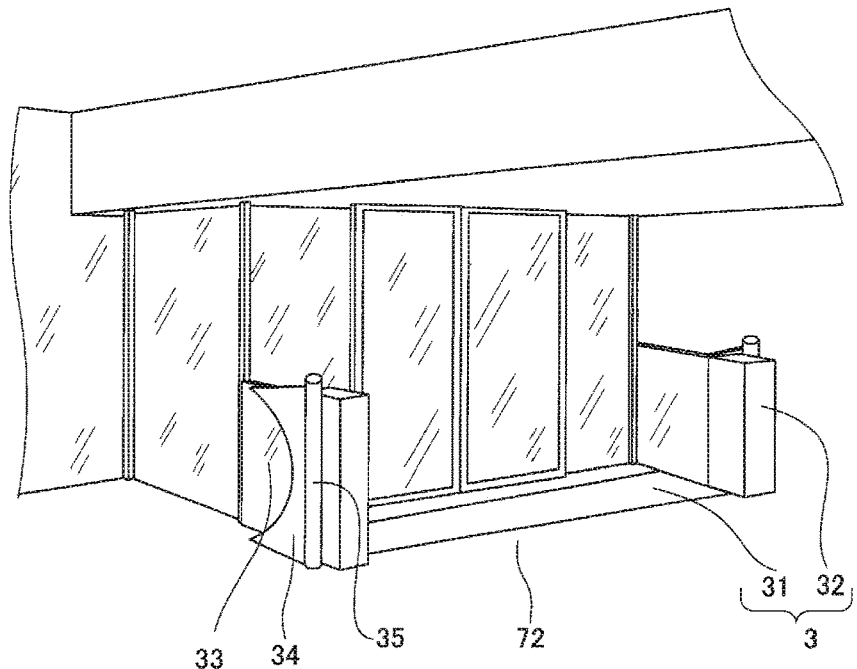
FIG. 26 is a perspective view illustrating a flood prevention device before a tubular water bag is installed according to another embodiment of the present invention.
Figure 27:
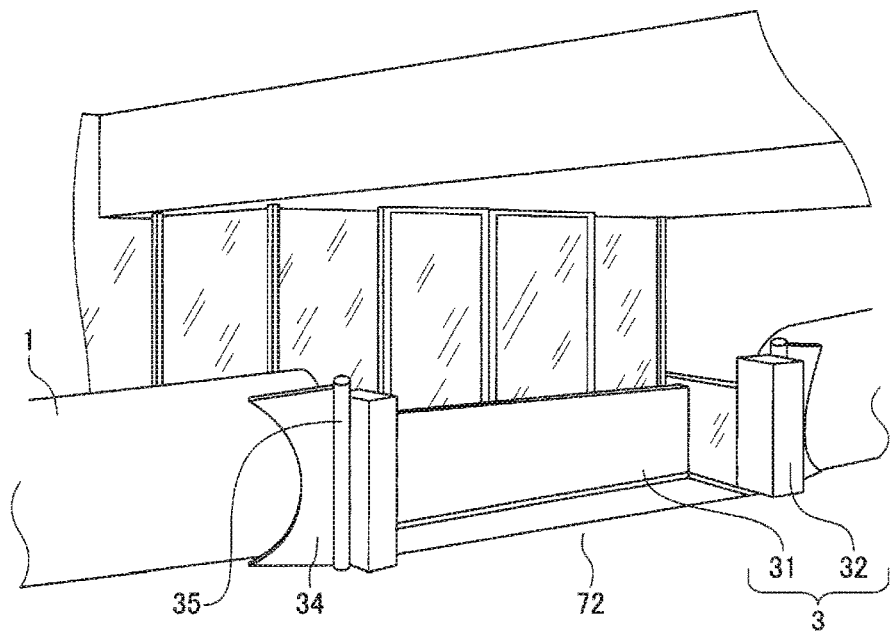
FIG. 27 is a perspective view illustrating the flood prevention device after the tubular water bag is installed.

As illustrated in FIGS. 26 and 27, the flap gate 3 can be also disposed at the entrance of a building. As illustrated in FIG. 26, the gate leaf 31 of the flap gate 3 is normally laid on a ground 72 to open the flap gate 3. In the event of flood, the tubular water bag 1 is installed with the opened flap gate 3 and is placed into a standby state, ensuring access to the flood prevention area 2.

Upon the arrival of flood, as illustrated in FIG. 27, the gate leaf 31 of the flap gate 3 is raised from the ground 72 to close the flap gate 3, allowing the flap gate 3 to act as a flood prevention wall with the tubular water bag 1.

Figure 29:
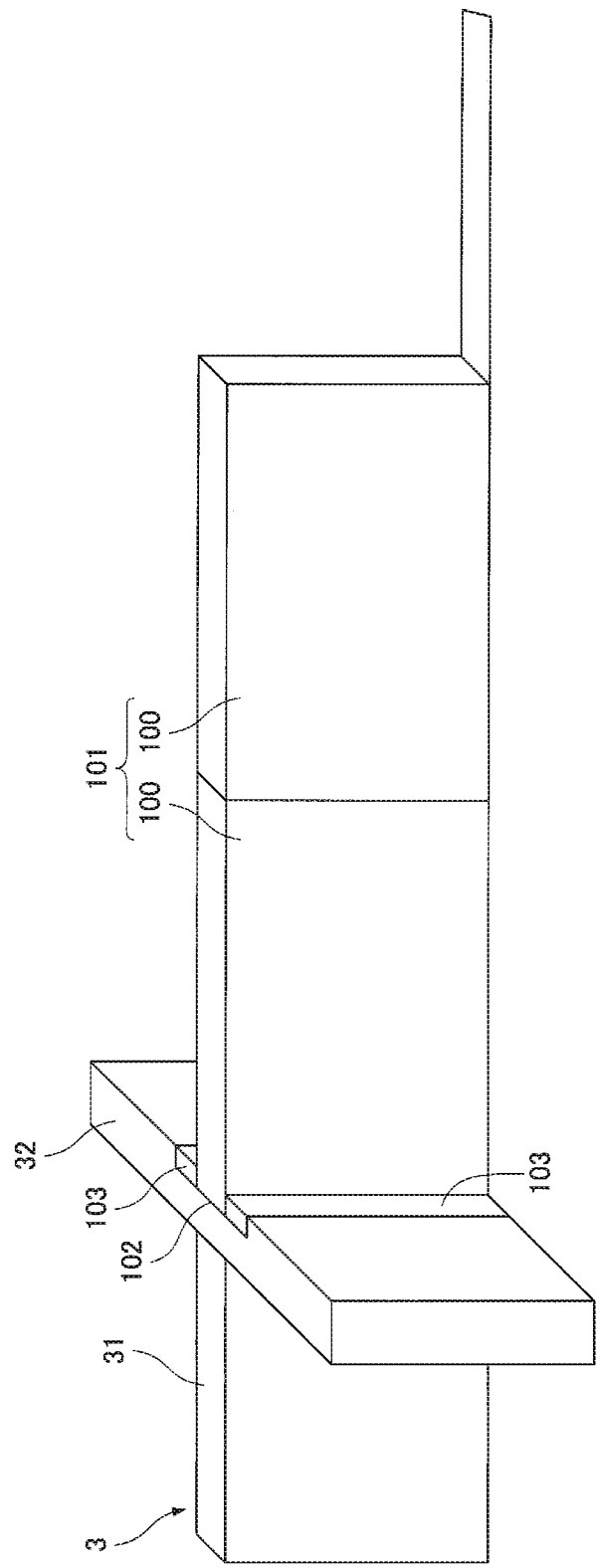
FIG. 29 is a perspective view illustrating a flood prevention device including panels provided as portable flood prevention materials according to another embodiment of the present invention.

FIG. 29 illustrates another embodiment of the present invention. Members that perform the same operations as those of the foregoing embodiments are indicated by the same reference numerals and the explanation thereof is omitted.

In this configuration, panels 100 are installed as portable flood prevention materials so as to form a flood proof fence 101. A side wall 32 forms a part joined to the panel 100 and has a groove 102 on the outer surface of the side wall 32, the groove 102 corresponding to one end face of the panel 100.

A pair of guide rails 103, 103 is installed in the groove 102. The guide rails 103, 103 are made of hard watertight rubber and form a watertight surface for the panel 100.

One end of the panel 100 on the side wall 32 is inserted between the guide rails 103, 103 and is held with watertightness between the guide rails 103, 103.

Figure 30:
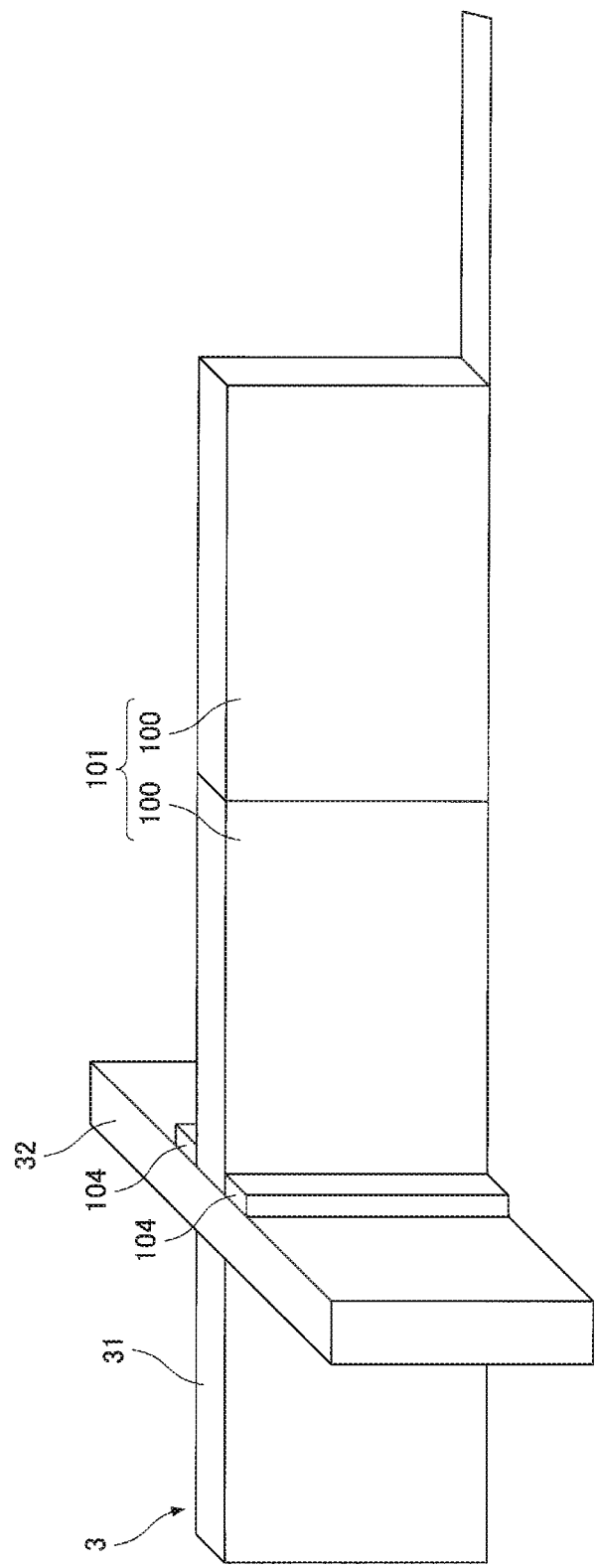
FIG. 30 is a perspective view illustrating a flood prevention device including panels provided as portable flood prevention materials according to another embodiment of the present invention.

The groove 102 is not always necessary. As illustrated in FIG. 30, guide rails 104, 104 can be installed so as to project from the outer surface of the side wall 32.

In this case, the guide rails 104, 104 are metallic members with watertight surfaces made of hard watertight rubber.

In this configuration, one end of the panel 100 on the side wall 32 is inserted between the guide rails 104, 104 and is held with watertightness between the guide rails 104, 104.

The invention claimed is:

1. A flood prevention device comprising: a gate device constituting a passage between a flood prevention area and an outside area, and a portable flood prevention material that separates the flood prevention area and the outside area with the gate device,
   wherein the gate device has a side wall corresponding to one end of the portable flood prevention material;
   wherein the gate device has a watertight surface on the side wall, the watertight surface stopping water between the side wall and the portable flood prevention material;
   wherein the portable flood prevention material includes a tubular water bag; and
   wherein the gate device includes a joint hole on the side wall, the joint hole allowing insertion of one end of the tubular water bag and having an inner surface constituting the watertight surface for stopping water between the side wall and the tubular water bag.

2. A flood prevention device comprising: a gate device constituting a passage between a flood prevention area and an outside area, and a portable flood prevention material that separates the flood prevention area and the outside area with the gate device,
   wherein the gate device has a side wall corresponding to one end of the portable flood prevention material;
   wherein the gate device has a watertight surface on the side wall, the watertight surface stopping water between the side wall and the portable flood prevention material;
   wherein the portable flood prevention material includes a tubular water bag; and
   wherein the gate device includes a joint member having a joint hole on the side wall, the joint hole allowing insertion of one end of the tubular water bag, the joint hole having an inner surface constituting the watertight surface for stopping water between the side wall and the tubular water bag.

3. A flood prevention device comprising: a gate device constituting a passage between a flood prevention area and an outside area, and a portable flood prevention material that separates the flood prevention area and the outside area with the gate device,
   wherein the gate device has a side wall corresponding to one end of the portable flood prevention material;
   wherein the gate device has a watertight surface on the side wall, the watertight surface stopping water between the side wall and the portable flood prevention material;
   wherein the portable flood prevention material includes a tubular water bag; and
   wherein the tubular water bag has a water bag height larger than a height of a gate leaf of the gate device, the water bag height being 1.11 times to 1.67 times as large as the height of the gate leaf.

4. The flood prevention device according to claim 3, wherein the gate device includes a watertight member on the side wall, the watertight member being connectable to or separable from a surface of the tubular water bag, the surface facing the outside area, the watertight member having the watertight surface for stopping water between the watertight member and the tubular water bag.

* * * * *